April 12, 1966  R. J. HAWKINS  3,245,179
PRESSURE VESSELS
Filed April 18, 1960  3 Sheets-Sheet 2
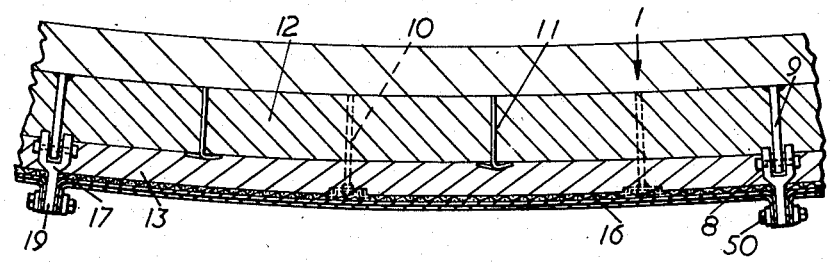
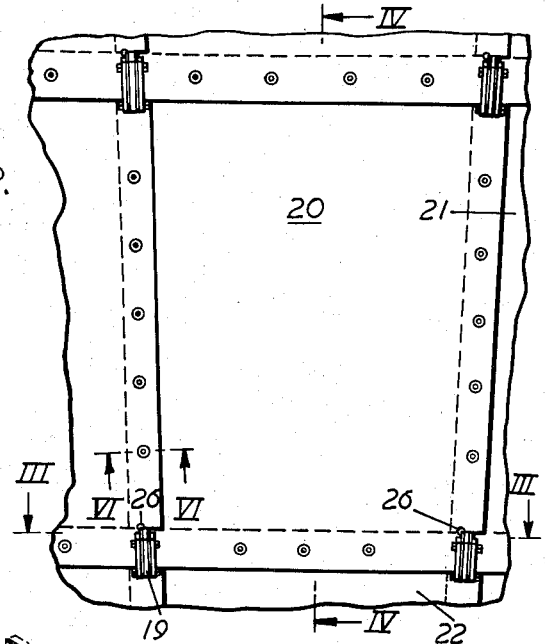
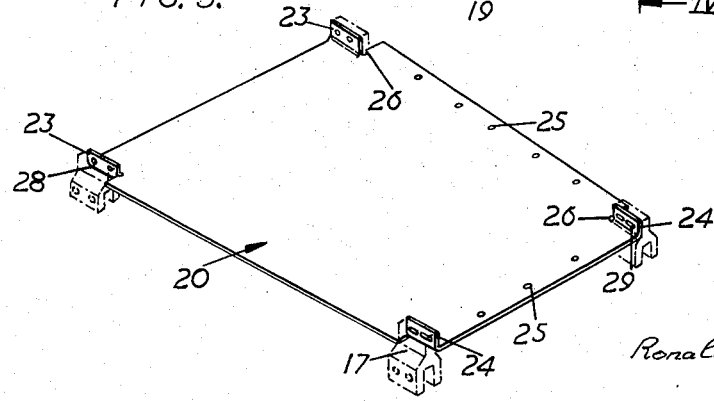
Ronald J. Hawkins
Inventor
By
J. P. Moran
Attorney

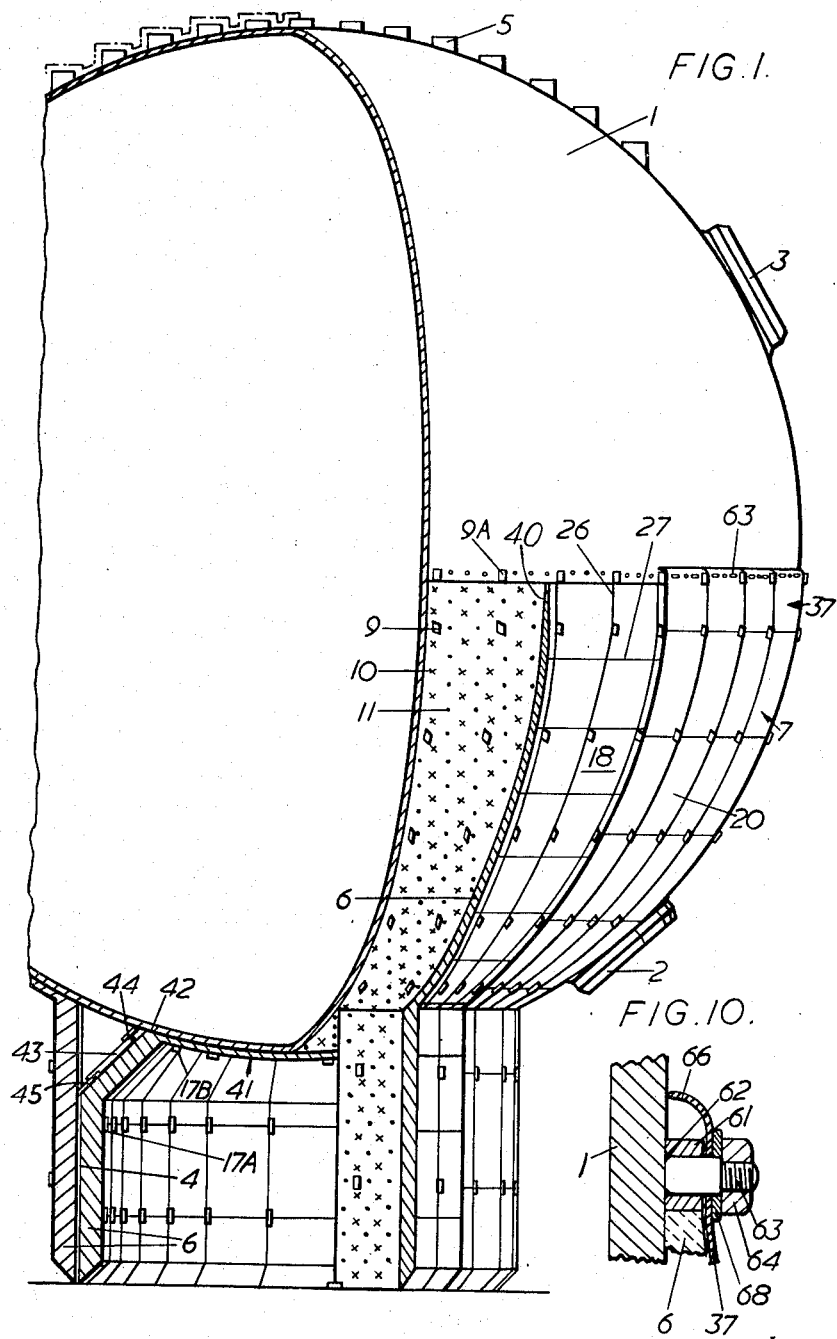

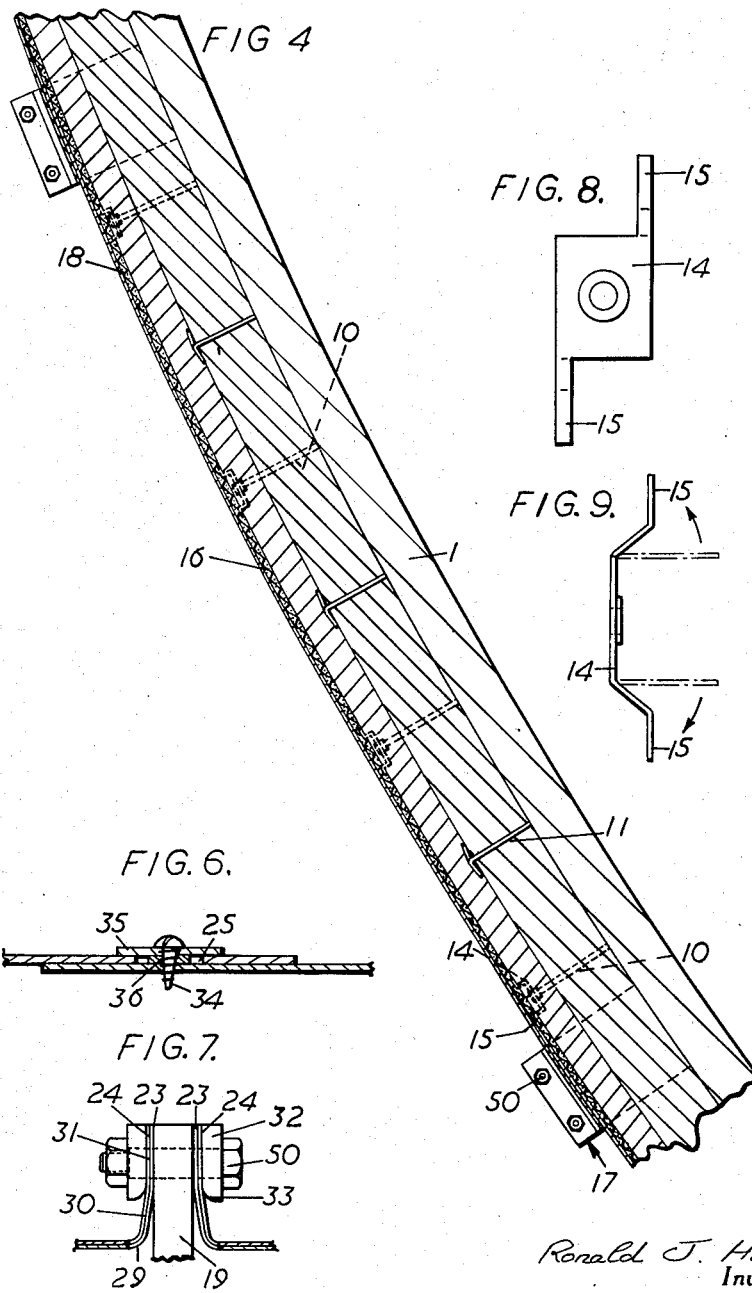

3,245,179
PRESSURE VESSELS
Ronald J. Hawkins, London, England, assignor to Babcock & Wilcox Limited, London, England, a British company
Filed Apr. 18, 1960, Ser. No. 23,014
Claims priority, application Great Britain, Apr. 16, 1959, 12,923/59
1 Claim. (Cl. 52—80)

This invention relates to pressure vessels adapted to contain hot fluids under pressure and particularly to pressure vessels provided externally with thermal insulation. Thermal insulation may be applied to a pressure vessel simply to reduce heat losses or, as in the case of a nuclear reactor pressure vessel, an object of the insulation may be to limit temperature gradients and resultant thermal stresses in the pressure vessel wall. The pressure vessel enclosing the core of a gas-cooled heterogeneous nuclear reactor may be of very large size and the application of effective insulation to the vessel in an economical manner is an objective of importance, one difficulty in obtaining which arises from the substantial expansion of the vessel when brought into use and the necessity of accommodating the expansion both by the insulation and by cleading with which the insulation is desirably covered. To satisfy the requirements of effectiveness and economy the cleading must be formed of panels which are economical to construct and install and which are capable of accommodating the relative thermal expansions and contractions of the pressure vessel. The provision of inexpensive cleading tends to be more difficult when the pressure vessel is of spherical shape.

The present invention includes a pressure vessel adapted to contain a hot fluid under pressure, having a layer of thermal insulation disposed between an external surface thereof and cleading formed of flexible sheet metal panels arranged with the adjacent edges of neighbouring panels overlapping one another and connected by means holding together the edges in a manner permitting relative lateral movements of the panels which are provided with lugs extending outwardly from the cleading and which from part of resilient connecting means serving to tie the panels to anchor means on the pressure vessel and adapted to permit relative expansion or contraction of the pressure vessel in relation to the cleading.

The invention further includes a pressure vessel adapted to contain a hot fluid under pressure and having a layer of thermal insulation disposed between an external surface thereof and cleading formed of flexible sheet metal panels arranged with the adjacent edges of neighbouring panels overlapping one another and connected by means holding together the edges in a manner permitting relative lateral movements of the panels which are provided with resilient lugs extending outwardly from the cleading, serving to tie the panels to anchor means on the pressure vessel and adapted to permit relative expansion or contraction of the pressure vessel in relation to the cleading.

The invention also includes a nuclear reactor pressure vessel having a layer of thermal insulation disposed, over a part thereof subject to cooling by the coolant, between its external surface and cleading formed of flexible sheet metal panels arranged with the adjacent edges of neighbouring panels overlapping one another and connected by means holding together the edges in a manner permitting relative lateral movements of the panels which are provided with resilient lugs extending outwardly from the cleading, serving to tie the panels to anchor means on the pressure vessel and adapted to permit relative expansion or contraction of the pressure vessel in relation to the cleading.

The invention will now be described, by way of example, with reference to the accompanying drawings, in which:

FIGURE 1 is a side view partly in section of a portion of a spherical pressure vessel parts of which are broken away for clarity;

FIGURE 2 shows a cleading panel and parts of adjacent panels in position on the pressure vessel;

FIGURE 3 is a fragmentary sectional view through the wall of the pressure vessel as indicated by the arrows III—III in FIGURE 2;

FIGURE 4 is fragmentary sectional view through the wall of the pressure vessel as indicated by the arrows IV—IV of FIGURE 2;

FIGURE 5 is a cleading panel with anchor links shown in broken line;

FIGURE 6 is a sectional view through the overlapping portions of two cleading panels as indicated by the arrows VI—VI in FIGURE 2;

FIGURE 7 is a detailed view of a part of an anchor link and adjacent parts of adjacent panels connected to the link;

FIGURE 8 is a detailed view of an expanded metal mesh retaining clip;

FIGURE 9 is a side view of the clip in FIGURE 8 before and after deformation; and FIGURE 10 is a detailed view of a connection used to secure the upper edge of the cleading to the pressure vessel wall.

Referring to FIGURE 1 a spherical pressure vessel shell 1 encloses a gas-cooled, graphite-moderated, heterogeneous nuclear reactor (not shown). The vessel is of about 70 feet diameter and is provided with four gas inlets 2 and four gas outlets 3 arranged uniformly around it and through which the coolant gas flows. The pressure vessel 1 is provided at its upper end with charge tube nozzles 5 and rests upon a cylindrical steel skirt 4.

The inner and outer surfaces of the skirt 4 and the lower half of the pressure vessel shell 1 are thermally insulated from the surrounding air by a double layer of insulation 6 covered by cleading 7. The cleading is necessary to hold the insulation in place in the event of it breaking up because the pressure vessel is not accessible for maintenance while in use. At approximately the equator of the pressure vessel the insulating layer 6 is tapered as at 40.

The surfaces of the pressure vessel shell 1 and the skirt 4 are provided with rows of radially extending projections in the form of anchor plates 9, tie rods 10, and studs 11 which are flash welded in position. The anchor plates 9 lie in vertical planes which contain the diameter of the pressure vessel 1 and which are equiangularly spaced, and are arranged in horizontal rows. The tie rods 10 have their outer end portions threaded and are indicated in FIGURE 1 by crosses, while the studs 11 have their outer end portions split longitudinally and are indicated by dots.

The double insulation layer 6 comprises an inner layer of high temperature insulation and an outer layer of low temperature insulation. The inner and outer layers of insulation are each formed from a single layer of flat slabs of insulating material known as 85 percent magnesia, each slab being of rectangular shape 36 inches long and 6 inches wide. Referring to FIGURES 3 and 4 slab 12 which constitutes the inner or high temperature insulation are four inches thick while slabs 13 which constitute the outer or low temperature insulation are only two inches thick. The slabs 12 and 13 are readily cut to size where necessary and are easily pierced to allow the tie rods 10 and studs 11 to pass through them so that they may hold them in place. When the slabs 12 are in position they are held in place by the split ends of studs 11, which are bent in opposite directions. Before the slabs 13 are placed in position aluminium anchor links 17, of the shape indicated in broken lines in FIGURE 5, are shackled by their bifurcated ends by means of bolts 8 to the end portions of the anchor plates 9 which extend slightly beyond the high temperature insulation.

The slabs 13 of the low temperature insulation are placed over slabs 12 and are arranged so that the joints between them are staggered in relation to the joints between the slabs 12 beneath. The slabs 13 are held in position by rectangular washers 14 such as shown in FIGURES 8 and 9 which are retained between nuts screwed onto the threaded ends of the tie rods 10.

Each washer 14 has two limbs 15 respectively extending from two diagonally opposite corners. Each limb 15 is initially bent perpendicular to the plane of the washer 14 as shown in broken lines in FIGURE 9 so that when the washer is fixed to tie rod 10 the limbs can extend through an expanded metal mesh 16 which covers the low temperature insulation as shown in FIGURE 3. The end portions of the limbs 15 are then bent outwardly as shown in FIGURES 3, 8 and 9 and serve to hold the mesh 16 in place.

The metal mesh 16 provides a base to which a thin layer of quick-setting cement is applied. The layer of cement is divided into rectangular panels 18 as shown in FIGURE 1 by grooves 26, 27 respectively lying in vertical and horizontal planes, the supporting mesh 16 allowing the panels to move relative to one another during expansion and contraction of the pressure vessel.

The cement panels 18 are finally covered with the cleading 7 which is formed from overlapping rings of aluminium cleading panels 20 or 18 S.W.G. which extend downwards from the equator of the pressure vessel 1 as previously mentioned. Each ring of panels on the pressure vessel 1 is formed from panels of smaller size than the ring immediately above with the exception of the top ring. The largest size of panel used is about 6 feet long and about 4 feet wide. FIGURE 2 shows one panel 20 applied to the pressure vessel where it can be seen to overlap along its right and lower marginal edges respectively the adjacent edges of the panel 21 on its right and the panel 22 immediately below.

Individual panels are trapezoidally shaped as shown in FIGURE 5, each panel having one of two pairs of parallel upturned lugs 23 and 24 located at each of its corners. A row of holes 25 along each of the two overlapping marginal portions enables those portions to be secured to the marginal portions of the panels immediately beneath. The upturned lugs 23 and 24 are formed by cutting the corner portions of the panel and bending the corner portions outwards. Each cut ends in a drill hole 26 which prevents the cut from extending. At opposite ends of the longer of the parallel sides of the panel the lugs 23 are each provided with a pair of bolt holes 28 which enable a pair of bolts 50 to hold the lugs to stem portions 19 of the anchor links 17 which extend through the cement panels 18 as shown in FIGURE 3. The other pair of lugs of the panel 20 are each provided with slots 29 in place of the bolt holes 28, the slots allowing sufficient freedom of movement of the lugs 24 relative to the bolts 50 to accommodate expansion and contraction of the pressure vessel 1 in the direction of elongation of the slots. The bolts 50 are shouldered as shown in FIGURE 7 so that when their nuts are done up tightly the slotted lugs 24 are still able to move relative to the bolts.

FIGURE 7 shows in detail the way in which the lugs 23, 24 are shaped and connected to the stem portion 19 of an anchor link 17. The stem portion 19 is sandwiched between two pairs of upturned lugs 23, 24 respectively joined to the upper and lower panels on each side of the anchor link 17 (see FIGURE 2). Each lug affords a flexible connection between the attached panel and stem portion 19 by including a curved root portion 29 spaced from the stem portion 19, an intermediate straight portion 30 inclined outwardly towards the stem portion 19, and an end portion 31 extending parallel to the surface of the stem portion 19 and containing either the bolt holes 28 or bolt slots 29. Washers 32 are located respectively between the head of the bolt and the nut and the lugs 24, the washers having inwardly directed curved faces 33 which enable the inclined straight portions 30 to flex laterally without damage. This lateral flexing allows expansion of the pressure vessel in a direction transverse to lugs i.e. in a horizontal direction, as it heats up.

The overlapping outer marginal portions of each panel are screwed to the marginal portions of the panels beneath in a manner which permits lateral movements between the panels and which is illustrated in FIGURE 6. A self tapping screw 34 passes through a circular washer 35 and a collar 36 within hole 25 and is screwed into the marginal portion of the underlying panel. Collar 36 is of smaller external diameter than hole 25 so that lateral movement between the panels is accommodated by lateral movement of collar 36 within hole 25. Washer 35 has a sufficiently large portion of its surface overlapping the edges of hole 25 to maintain it covered in all positions of collar 36. This form of connection holds the marginal portions of adjacent panels together yet allows them limited lateral movement to accommodate expansion of the pressure vessel.

Referring to FIGURE 1 the uppermost ring of cleading panels to be applied to the pressure vessel is the ring 37. Individual panels of this ring are connected at their lower ends to anchor links as previously described, but at their upper ends the panels are secured differently. Referring to FIGURE 1 anchor plates 9A secured to the pressure vessel 1 at the upper end of the cleading are shorter than the others and have the upper lugs of the panels 37 bolted directly to them without intervening anchor links. Between each pair of anchor plates 9A the panel is held by three shouldered studs 63, one of which is shown in detail in FIGURE 10, the centre stud of the three passing through a circular hole in the panel while the other two pass through holes elongated horizontally to permit expansion of the pressure vessel in relation to the panels. Referring to FIGURE 10 each of the shouldered studs 63 is flash welded to the pressure valve wall 1. A packing washer of glass cloth 61 separates the weld fillet 62 from the upper marginal edge of the cleading which is held loosely in place by a washer 68 and a nut 64 screwed onto the shouldered stud and spot welded to it. The upper edge 66 of the panel is bent over as shown. The upper marginal edge of the panel is thus held securely to the pressure vessel but is allowed sufficient freedom of movement by the shouldered stud to permit it to accommodate relative expansion and contraction of the pressure vessel.

Referring again to FIGURE 1 the cleading panel at the centre of the lowermost portion 41 of the pressure vessel 1 is circular, the rings of panels radiating therefrom, while the cleading panels covering the steel skirt 4 are rectangular. The circular central panel overlaps at its edges the lower edges of the ring of neighbouring panels, and is screwed to the said lower edges by a circle of screws arranged as described with reference to FIGURE 6.

The insulating layer 6 on the lowermost portion 41 of the pressure vessel 1 separates from the pressure vessel surface at 42 and joins with the insulating layer 6 on the inner surface of skirt 4. A ring of backing plates 43, having outwardly extending studs 11 and tie-rods 10 (not shown), supports the insulating layer 6 where it separates from the pressure vessel. The upper ends of the backing plates 43 are bolted to a ring of lugs 44 fixed to the underside of the pressure vessel and are held at their lower ends behind a ring of upwardly extending stop-plates 45 fixed to the inner surface of skirt 4. The stop plates 45 allow the lower ends of the plates 43 to move longitudinally. A ring of specially shaped cleading panels covers the surface of the thermal insulation where supported by plates 43, each of these panels having their upper and lower marginal portions bent so as to conform to the surface beneath them and between the anchor links 17A and 17B to which the specially shaped panels are attached.

At the lower end of skirt 4 the insulating layer 6 tapers, as shown, while at the upper external surface of skirt 4 the cleading panels have their upper marginal portions turned outwards so as to underlie the lower marginal portions of the ring of panels immediately above. Self-tapping screws are used to hold the overlapping portions of the panels together as described with reference to FIGURE 6.

The arrangement of the cleading panels described above accommodates expansion and contraction of the pressure vessel 1 with change in temperature both vertically and horizontally. Vertical expansion is accommodated by movement of the holding bolts 50 along the slotted lugs 24 and horizontal expansion is accommodated by lateral flexing of the lugs 23 and 24. During expansion in both directions the arrangement of the self-tapping screws 34 in the overlapping edges of the panels permits neighbouring panels to move laterally with respect to one another.

Conduction of heat from the pressure vessel 1 along the anchor plates 9 and anchor links 17 is small due to their limited cross-sectional areas and the shackle connection between them. Thus the danger of objectionable localised cooling of the pressure vessel wall at points from which the anchor plates 9 extend is avoided.

Thus the outer surface of the lower half of the pressure vessel 1 is provided with thermal insulation and cleading which is simple to install, reliable in operation and adapted to accommodate the thermal expansions and contractions of the pressure vessel. There is no need to cut the panels very accurately to size at site and little work is involved in the formation of the holes in the panels and the attachment to the anchor links 17 of the lugs 23, 24. Moreover, owing to the simple nature of the fastening means whereby the panels are secured in position, the panels may rapidly be assembled by relatively unskilled labour.

If preferred the self-tapping screws 34 may be replaced by other devices, e.g., pop rivets, which are passed through registering holes formed in the overlapping portions of adjacent panels.

I claim:

A pressure vessel comprising a shell adapted to contain the pressure of said vessel, a layer of insulating material disposed over the outer surface of said shell, means for securing said layer of insulating material to said shell, cleading covering said insulation, said cleading including a plurality of panels arranged so that all adjacent panels have overlapping peripheral edge portions, means for directly connecting together the overlapping edge portions of adjacent cleading panels to accommodate relative lateral movement therebetween, said latter means including a series of spaced holes formed in the overlapping edge of one panel, a spacer having a diameter smaller than one of said holes and being disposed therein, a washer overlying said one of said holes, and a fastener extending through said washer and aligned spacer for connecting said panels together, and means on each of said cleading panels and said shell connecting said panels to said shell to permit relative transverse and lateral movement therebetween for accommodating expansion and contraction of said shell relative to said cleading, said last named means comprising anchor plates connected to said shell and projecting outwardly therefrom, resilient laterally bent lugs on the marginal portions of said panels, means defining aligned apertures in said lugs and said anchor plates, and fastening means extended through said aligned apertures for securing said panels in position relative to said shell.

References Cited by the Examiner

UNITED STATES PATENTS

| | | | |
|---|---|---|---|
| 553,319 | 1/1896 | Rose | 52—248 XR |
| 1,120,108 | 12/1914 | Warwick | 52—249 |
| 1,336,490 | 4/1920 | Staples | 211—136 |
| 1,539,599 | 5/1925 | Reedy | 189—88 X |
| 1,621,929 | 3/1927 | Horton | 52—81 XR |
| 1,763,263 | 6/1930 | Shanks | 52—362 |
| 1,886,962 | 11/1932 | LaRoche | 52—79 |
| 1,924,832 | 8/1933 | Brandt | 52—249 XR |
| 1,972,508 | 9/1934 | Zeiner | 52—249 XR |
| 2,074,874 | 3/1937 | Vogel | 52—269 XR |
| 2,286,167 | 6/1942 | Davis | 52—335 |
| 2,295,103 | 9/1942 | Friedly. | |
| 2,313,325 | 3/1943 | Dalton | 52—346 |
| 2,314,949 | 3/1943 | Palmer | 52—395 XR |
| 2,362,119 | 11/1944 | Destefano | 52—347 |
| 2,483,346 | 9/1949 | Maul | 52—597 |
| 2,702,104 | 2/1955 | Harrison et al. | 52—61 |
| 2,712,865 | 7/1955 | Steinmayer | 52—160 |
| 2,731,374 | 1/1956 | DeReus | 52—80 XR |
| 2,738,094 | 3/1956 | Fowler | 220—9 |
| 2,863,815 | 12/1958 | Moore et al. | 204—193.2 |
| 2,884,100 | 4/1959 | McKee | 52—394 |
| 2,928,565 | 3/1960 | Glascoe | 220—15 X |
| 2,959,318 | 11/1960 | Clark et al. | 220—15 |
| 2,982,623 | 5/1961 | Johnson | 52—249 XR |
| 3,000,145 | 9/1961 | Fine | 52—699 |

FOREIGN PATENTS 582,409    9/1958    Italy.

FRANK L. ABBOTT, *Primary Examiner.*

ROGER L. CAMPBELL, WILLIAM I. MUSHAKE, JACOB L. NACKENOFF, *Examiners.*